(12) United States Patent
Pearce

(10) Patent No.: US 11,553,092 B2
(45) Date of Patent: Jan. 10, 2023

(54) CLOUD MIGRATION UTILITIES FOR TELEPHONY SERVICES

(71) Applicant: Cisco Technology, Inc., San Jose, CA (US)

(72) Inventor: Christopher Edwin Pearce, Dallas, TX (US)

(73) Assignee: Cisco Technology, Inc., San Jose, CA (US)

(*) Notice: Subject to any disclaimer, the term of this patent is extended or adjusted under 35 U.S.C. 154(b) by 29 days.

(21) Appl. No.: 17/347,009

(22) Filed: Jun. 14, 2021

(65) Prior Publication Data

US 2022/0400180 A1 Dec. 15, 2022

(51) Int. Cl.
*H04M 3/00* (2006.01)
*H04M 7/00* (2006.01)
*H04M 3/51* (2006.01)

(52) U.S. Cl.
CPC ....... *H04M 7/0087* (2013.01); *H04M 3/5191* (2013.01)

(58) Field of Classification Search
CPC .......................... H04M 7/0087; H04M 3/5191
USPC ....... 379/265.01–265.14, 266.01–266.1, 309
See application file for complete search history.

(56) References Cited

U.S. PATENT DOCUMENTS

| | | | |
|---|---|---|---|
| 9,460,187 B2 | 10/2016 | Soundararajan et al. | |
| 10,061,611 B2* | 8/2018 | Tarasuk-Levin | .... G06F 9/44505 |
| 10,133,607 B2 | 11/2018 | Suit | |
| 10,320,893 B2 | 6/2019 | Syed et al. | |
| 10,484,334 B1* | 11/2019 | Lee | .......... H04L 67/30 |
| 2009/0088142 A1* | 4/2009 | Baribault | ................ H04W 8/24 455/418 |
| 2010/0254370 A1* | 10/2010 | Jana | ..... H04L 65/1083 725/116 |
| 2016/0378524 A1* | 12/2016 | Gough | ................ G06F 9/45558 718/1 |
| 2017/0339221 A1* | 11/2017 | Wang | ...................... H04L 67/02 |
| 2019/0306236 A1 | 10/2019 | Wiener et al. | |
| 2020/0210218 A1* | 7/2020 | Lu | ....................... H04L 41/0813 |
| 2020/0287797 A1 | 9/2020 | Firment et al. | |
| 2020/0320397 A1* | 10/2020 | Liu | ........................ G06N 3/084 |
| 2021/0026673 A1* | 1/2021 | Forney | ............... H04L 67/1031 |
| 2021/0084117 A1* | 3/2021 | Ovadia | ................... H04L 67/34 |

OTHER PUBLICATIONS

"Call Parking", online: https://en.wikipedia.org/wiki/Call_parking, Mar. 11, 2015, 1 page, Wikimedia Foundation, Inc.

(Continued)

*Primary Examiner* — William J Deane, Jr.
(74) *Attorney, Agent, or Firm* — Behmke Innovation Group LLC; Kenneth J. Heywood; Jonathon P. Western

(57) ABSTRACT

In various embodiments, a device receives profile data regarding users or devices of an on-premise telephony system. The device identifies, based on the profile data, group features associated with the users or devices of the on-premise telephony system. The device forms a candidate set of users or devices of the on-premise telephony system for migration to a cloud-hosted call agent, based on them sharing at least one of the group features. The device provides data indictive of the candidate set of users or devices to a user interface for display.

20 Claims, 8 Drawing Sheets

(56) References Cited

OTHER PUBLICATIONS

"Call Pickup", online: https://en.wikipedia.org/wiki/Call_pickup, Apr. 23, 2020, 1 pages, Wikimedia Foundation, Inc.
"Silent Monitoring", Feature Configuration Guide for Cisco Unified Communications Manager, Release 10.5(2), Oct. 21, 2020, 6 pages, Cisco.com.
Stone, Katherine, "The Ultimate Guide to Call Hunting", online: https://getvoip.com/library/call-hunting/, Oct. 28, 2020, 11 pages, GetVoip.com.

* cited by examiner

CLOUD MIGRATION UTILITIES FOR TELEPHONY SERVICES

TECHNICAL FIELD

The present disclosure relates generally to computer networks, and, more particularly, to cloud migration utilities for telephony services.

BACKGROUND

Enterprises are increasingly moving their telephony deployments from on-premises (on-prem) to the cloud. For enterprises with a relatively small number of endpoints, it may be feasible to 'flash cut' a location, thereby migrating all of its users to the cloud at once. Larger enterprises, however, are typically unable or unwilling to do the same. Instead, a more gradual approach is often taken, whereby some users at a location are migrated to the cloud, while others continue to use the on-prem telephony deployment.

In cases in which only a portion of the telephony users at a location are migrated to the cloud while others remain on-prem, basic connectivity is preserved through the use of tandem connections. However, group features such as call pickup, call parking, etc. will not operate properly when users are homed to different call agents.

DESCRIPTION OF EXAMPLE EMBODIMENTS

Overview

Figure 1A:
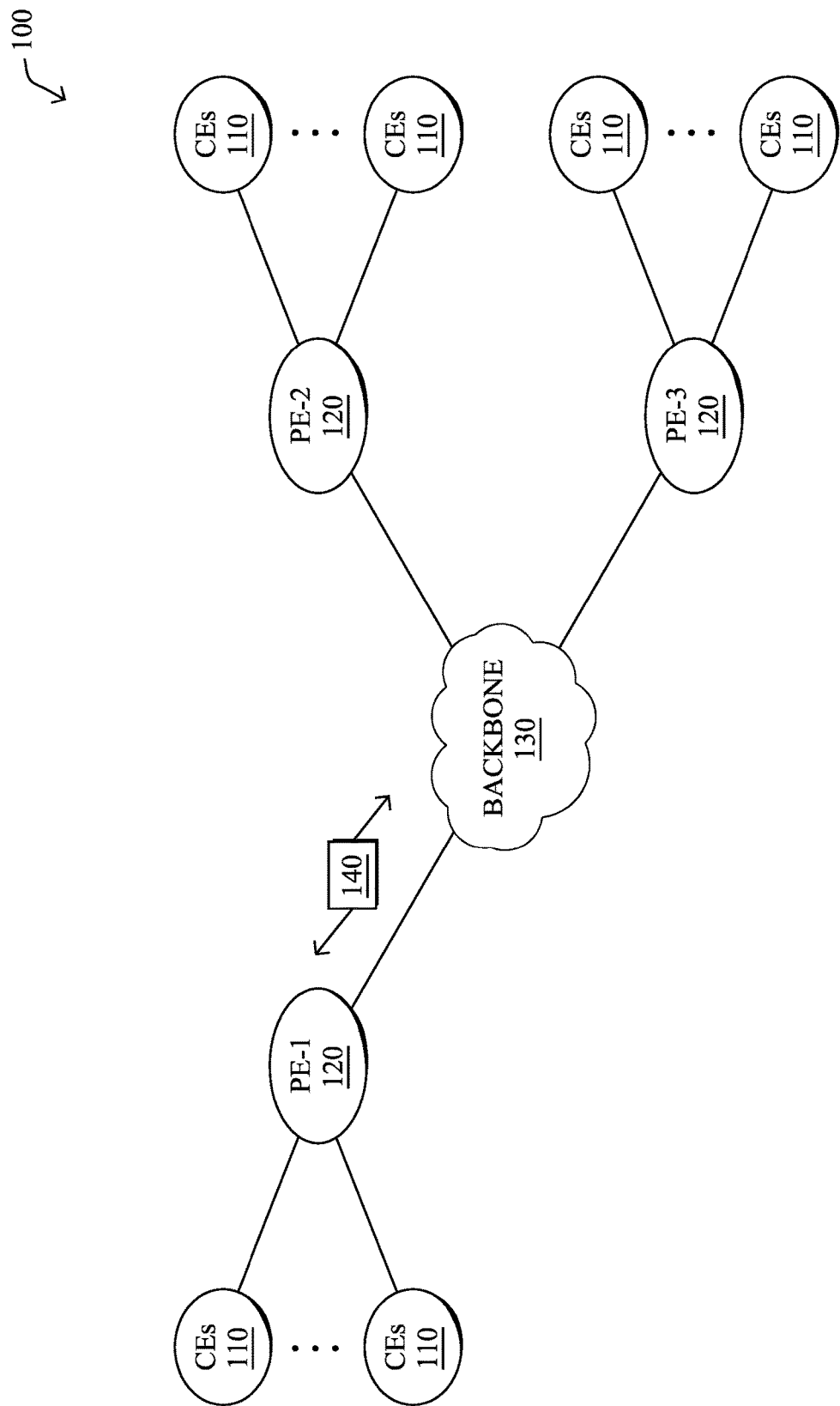
FIGS. 1A-1B illustrate an example communication network.

According to one or more embodiments of the disclosure, a device receives profile data regarding users or devices of an on-premise telephony system. The device identifies, based on the profile data, group features associated with the users or devices of the on-premise telephony system. The device forms a candidate set of users or devices of the on-premise telephony system for migration to a cloud-hosted call agent, based on them sharing at least one of the group features. The device provides data indictive of the candidate set of users or devices to a user interface for display.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless or PLC networks. That is, in addition to one or more sensors, each sensor device (node) in a sensor network may generally be equipped with a radio transceiver or other communication port such as PLC, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/5G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different Service Providers), with potentially a backup link (e.g., a 3G/4G/5G/LTE connection). A site of type B may itself be of different types:

2a.) Site Type B1: a site connected to the network using two MPLS VPN links (e.g., from different Service Providers), with potentially a backup link (e.g., a 3G/4G/5G/LTE connection).

2b.) Site Type B2: a site connected to the network using one MPLS VPN link and one link connected to the public Internet, with potentially a backup link (e.g., a 3G/4G/5G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/5G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/5G/LTE backup link). For example, a particular customer site may include a first CE router 110 connected to PE-2 and a second CE router 110 connected to PE-3.

Figure 1B:
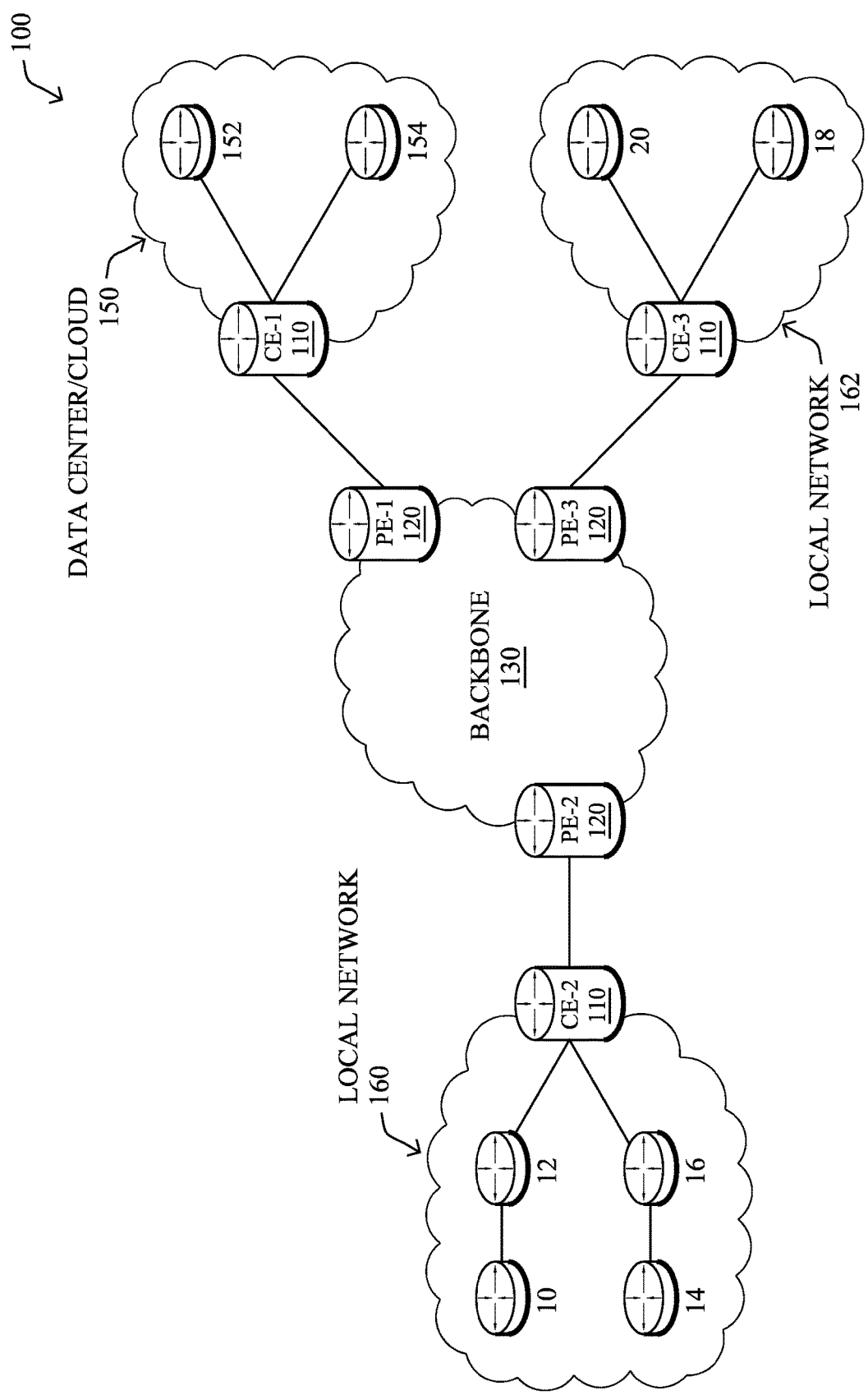

FIG. 1B illustrates an example of network 100 in greater detail, according to various embodiments. As shown, network backbone 130 may provide connectivity 1o between devices located in different geographical areas and/or different types of local networks. For example, network 100 may comprise local/branch networks 160, 162 that include nodes/devices 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

In some embodiments, the techniques herein may be applied to other network topologies and configurations. For example, the techniques herein may be applied to peering points with high-speed links, data centers, etc.

In various embodiments, network 100 may include one or more mesh networks, such as an Internet of Things network. Loosely, the term "Internet of Things" or "IoT" refers to uniquely identifiable objects (things) and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless or PLC networks, etc., are often on what is referred to as Low-Power and Lossy Networks (LLNs), which are a class of network in which both the routers and their interconnect are constrained: LLN routers typically operate with constraints, e.g., processing power, memory, and/or energy (battery), and their interconnects are characterized by, illustratively, high loss rates, low data rates, and/or instability. LLNs are comprised of anything from a few dozen to thousands or even millions of LLN routers, and support point-to-point traffic (between devices inside the LLN), point-to-multipoint traffic (from a central control point such at the root node to a subset of devices inside the LLN), and multipoint-to-point traffic (from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

In contrast to traditional networks, LLNs face a number of communication challenges. First, LLNs communicate over a physical medium that is strongly affected by environmental conditions that change over time. Some examples include temporal changes in interference (e.g., other wireless networks or electrical appliances), physical obstructions (e.g., doors opening/closing, seasonal changes such as the foliage density of trees, etc.), and propagation characteristics of the physical media (e.g., temperature or humidity changes, etc.). The time scales of such temporal changes can range between milliseconds (e.g., transmissions from other transceivers) to months (e.g., seasonal changes of an outdoor environment). In addition, LLN devices typically use low-cost and low-power designs that limit the capabilities of their transceivers. In particular, LLN transceivers typically provide low throughput. Furthermore, LLN transceivers typically support limited link margin, making the effects of interference and environmental changes visible to link and network protocols. The high number of nodes in LLNs in comparison to traditional networks also makes routing, quality of service (QoS), security, network management, and traffic engineering extremely challenging, to mention a few.

Figure 2:
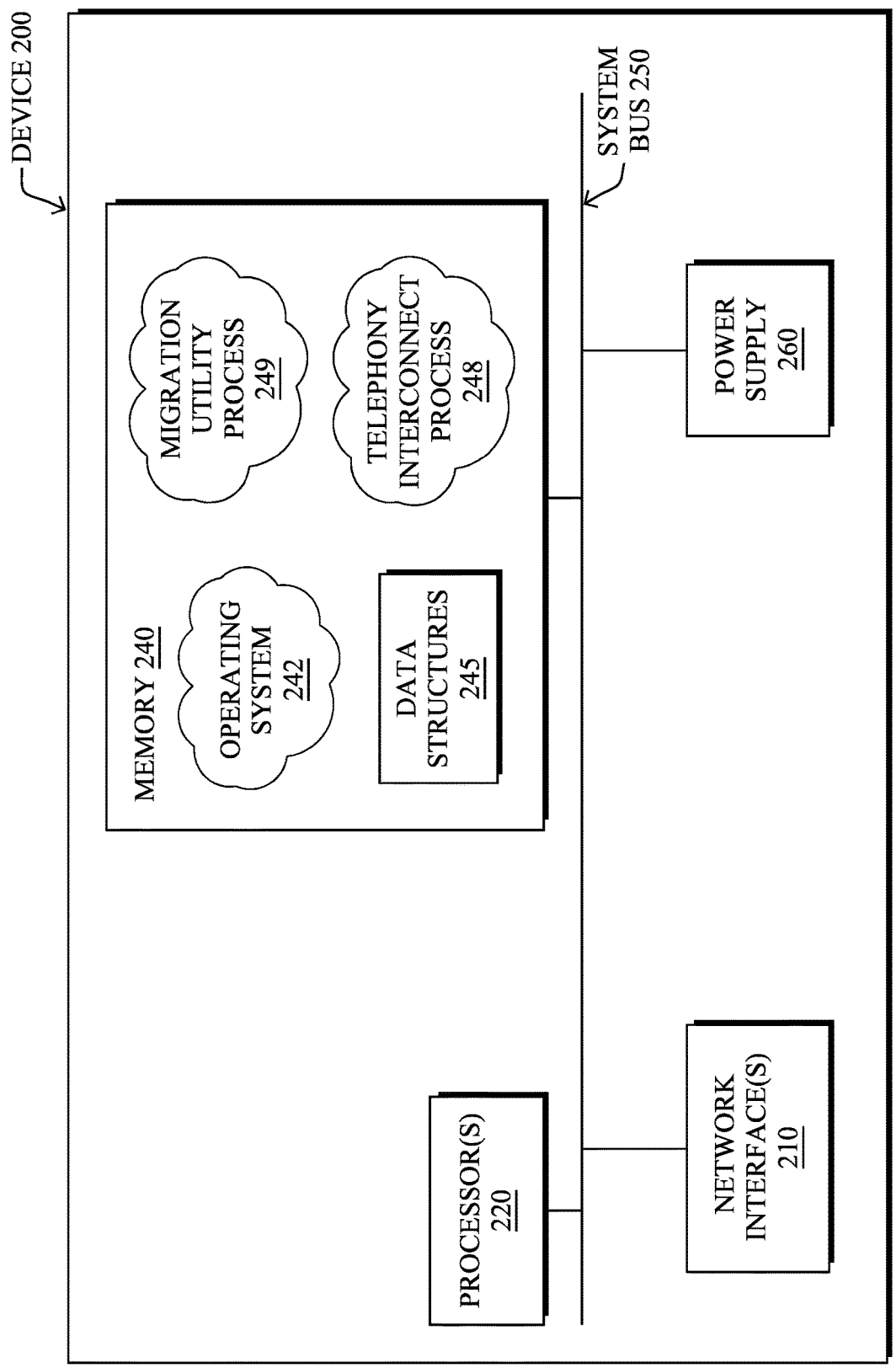
FIG. 2 illustrates an example network device/node.

FIG. 2 is a schematic block diagram of an example node/device 200 (e.g., an apparatus) that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. As shown, device 200 may comprise any or all of the following components: one or more network interfaces 210, one or more processors 220, and/or a memory 240 interconnected by a system bus 250, and powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a telephony interconnect process 248 and/or a migration utility process 249, as described herein, any of which may alternatively be located within individual network interfaces.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

Enterprises are increasingly providing enterprise-enabled mobile phones and other devices to their employees. In contrast to traditional mobile phones, calls made by enterprise-enabled phones are sent by the carrier to a specialized application, referred to as an enterprise 'call agent.' In turn, the call agent provides a host of features to the phone, such as supporting a dialing pattern of the enterprise, call hunting, dialing-class-of-service, shared line status, and the like.

Figure 3:
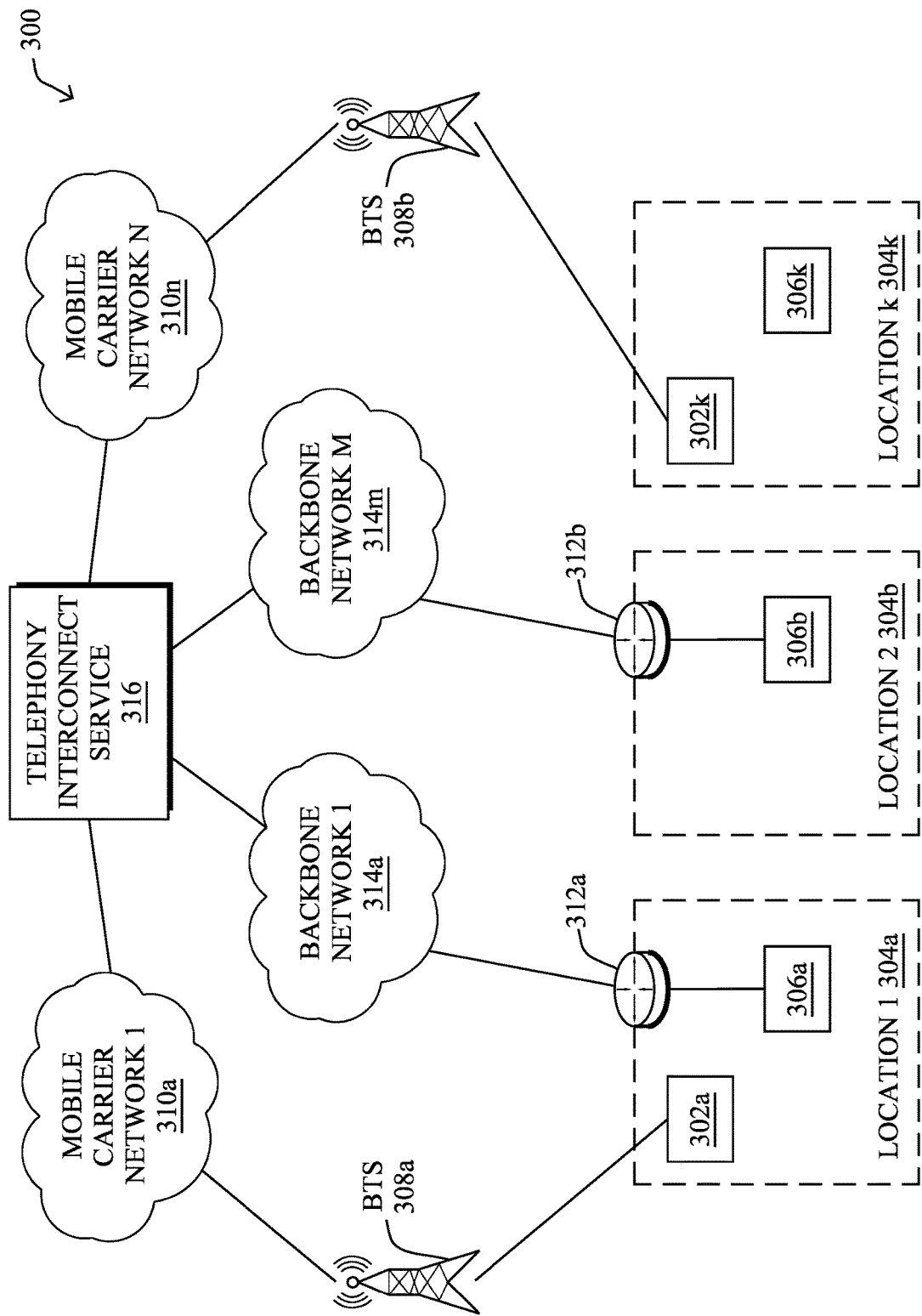
FIG. 3 illustrates an example enterprise telephony system.

FIG. 3 illustrates an example enterprise telephony system 300, according to various embodiments. For a typical enterprise, there may be any number of locations 304 distributed throughout a geographic area or even across the world, such as locations 304a, 304b, and 304k shown (e.g., a first location, a second location, through a $k^{th}$ location). For instance, locations 304 may include, but are not limited to, office buildings, branches, schools, hospitals, factories, and the like, that are associated with the same enterprise/entity.

In many instances, each location 304 includes its own computing network infrastructure, such as switches, routers, firewalls, session border controllers (SBCs), and the like. These networking devices provide connectivity between the various devices located in the corresponding location 304 and one or more provider/carrier networks, such as backbone networks 314a and 314b (e.g., a first through $M^{th}$ network) via their respective routers 312a and 312b, allowing these devices to maintain a data connection, externally.

In addition to wired connections between locations 304 and networks 314, mobile devices of the enterprise may communicate via any number of mobile carrier networks 310, also referred to as cellular networks, such as mobile carrier networks 310a and 310n (e.g., a first through $N^{th}$ mobile carrier network). For instance, assume that the user of mobile device 302 is present within location 304a. In such a case, mobile device 302a may communicate with a base transceiver station (BTS) 308a when in range and communicate wirelessly via mobile carrier network 310a, mobile device 302k may communicate with BTS 308b, etc. If the user of mobile device 302a later travels to another location, such as location 304k, mobile device 302 may communicate with BTS 308b connected to a different mobile carrier network 310n.

According to various embodiments, enterprise telephony system 300 also includes a telephony interconnect service 316 that comprises any number of servers or other computing devices that operate to oversee the various operations of enterprise telephony system 300 (e.g., through the execution of telephony interconnect process 248). For instance, telephony interconnect service 316 may comprise one or more clusters of servers that share resources and a database. Each cluster may have one server designated as a publisher, with the remaining servers designated as subscribers. This allows the publisher to disseminate configurations, Network Time Protocol (NTP) data, etc.

Typically, telephony interconnect service 316 operates as a central call agent that interconnects with mobile carrier networks 310, internet carrier networks 314, and the like, to offer VoIP services to mobile device 302, telephones 306a-306b, and the other communication devices of the enterprise across its various users and locations 304. For instance, consider the cases of telephone calls made to mobile device 302 and telephone calls made from mobile device 302. The endpoints of those calls may be: 1.) users connected to wireline carriers indirectly reachable via a mobile carrier, 2) users registered to the mobile carriers who do not use telephony interconnect service 316, 3.) VoIP users within the same enterprise directly registered to telephony interconnect service 316, and/or 4.) VoIP users associated with other enterprises directly registered to telephony interconnect service 316.

As noted above, enterprises are increasingly moving their telephony deployments from on-premises (on-prem) to a cloud-based service, such as telephony interconnect service 316. For enterprises with a relatively small number of endpoints, it may be feasible to 'flash cut' a location, thereby migrating all of its users to the cloud at once. Larger enterprises, however, are typically unable or unwilling to do the same. Instead, a more gradual approach is often taken, whereby some users at a location are migrated to the cloud, while others continue to use the on-prem telephony deployment.

In cases in which only a portion of the telephony users at a location are migrated to the cloud while others remain on-prem, basic connectivity is preserved through the use of tandem connections. However, group features such as call pickup, call parking, etc. will not operate properly when users are homed to different call agents Cloud Migration Utilities for Telephony Services The techniques herein introduce migration utilities for telephony services, to aid in the migration of users and their phone numbers to a cloud-hosted service. In some aspects, the techniques herein identify the relationships between user accounts and the call features that they use. By doing so, sets of user accounts can be migrated to the cloud, together, so that the group call functions that they use continue to function after the migration.

Specifically, according to one or more embodiments, a device receives profile data regarding users or devices of an on-premise telephony system. The device identifies, based on the profile data, group features associated with the users or devices of the on-premise telephony system. The device forms a candidate set of users or devices of the on-premise telephony system for migration to a cloud-hosted call agent, based on them sharing at least one of the group features. The device provides data indictive of the candidate set of users or devices to a user interface for display.

Illustratively, the techniques described herein may be performed by hardware, software, and/or firmware, such as in accordance with migration utility process 249, which may include computer executable instructions executed by the processor 220 (or independent processor of interfaces 210) to perform functions relating to the techniques described herein, such as in conjunction with telephony interconnect process 248.

Figure 4:
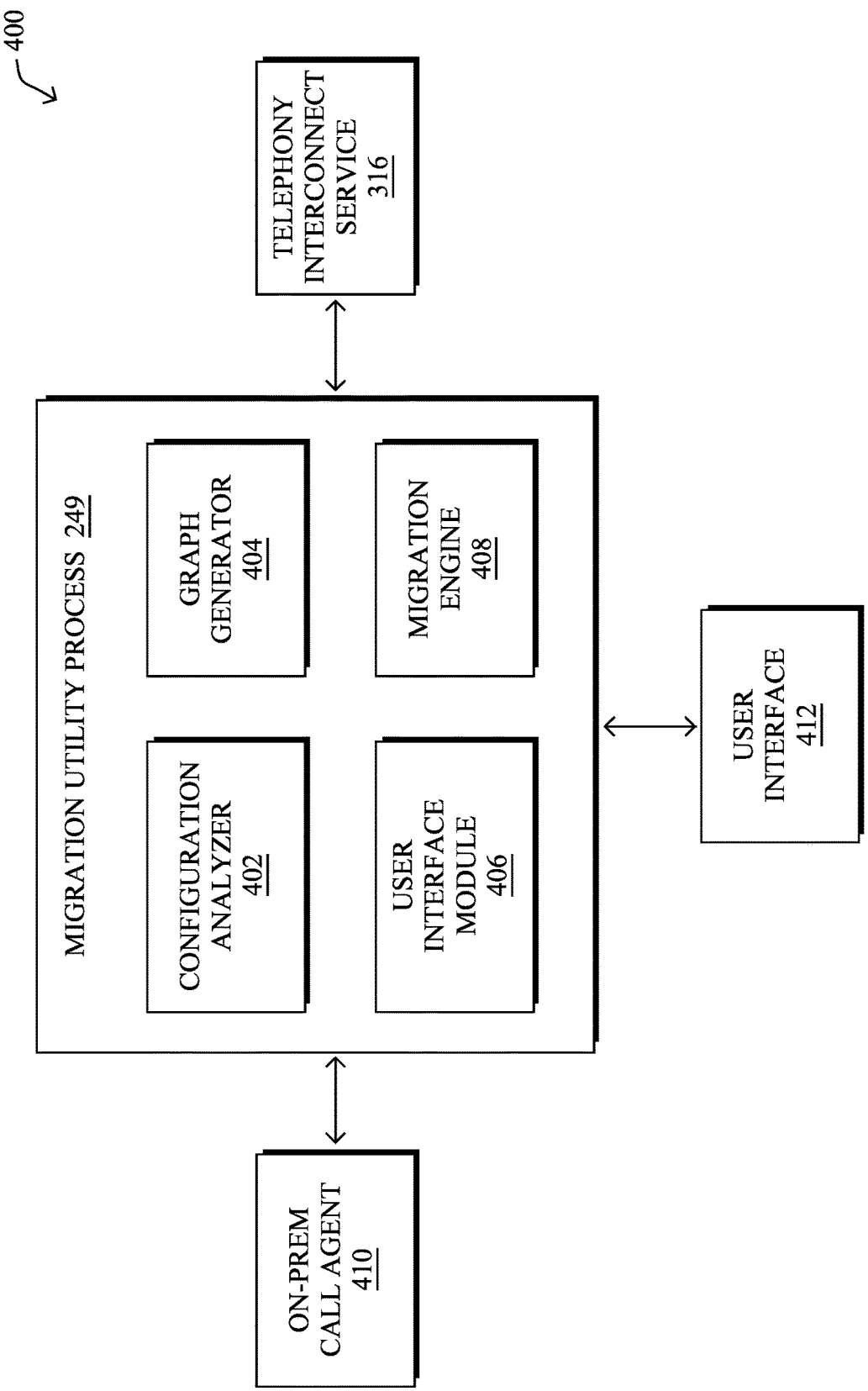
FIG. 4 illustrates an example architecture for a cloud migration utility for telephony services.

Operationally, FIG. 4 illustrates an example architecture 400 for a cloud migration utility for telephony services, according to various embodiments. At the core of architecture 400 is migration utility process 249 which may comprise any or all of the following components: a configuration analyzer 402, a graph generator 404, a user interface module 406, and/or a migration engine 408, according to various embodiments. As would be appreciated, the functionalities of these components may be combined or omitted, as desired. In addition, these components may be implemented on a singular device or in a distributed manner, in which case the combination of executing devices can be viewed as their own singular device for purposes of executing migration utility process 249.

During execution, configuration analyzer 402 may be configured to obtain profile data regarding the various on-prem entities to be migrated to a cloud-hosted call agent service (e.g., to telephony interconnect service 316). For instance, such entities may comprise users (e.g., as represented by user profiles), devices (e.g., IP phones, mobile phones, etc.), or the like. To obtain the profile data, configuration analyzer 402 may access the database of on-prem call agent 410 via an application programming interface (API) or the like, in one embodiment. In another embodiment, on-prem call agent 410 may send the profile data to configuration analyzer 402 on a push basis, without configuration analyzer 402 explicitly requesting the profile data. In yet another embodiment, configuration analyzer 402 may obtain the profile data indirectly from on-prem call agent 410. For instance, on-prem call agent 410 may export its profile database entries to a file or set of files, that are then used as input to 402.

In various embodiments, configuration analyzer 402 may assess the profile data for the various entities being managed on-prem, to identify which group features are associated with them. This may entail, for instance, identifying the group feature(s) for which the profile of the entity is configured to use. In general, the term 'group feature' is used herein to refer to a function of a telephony system that may be shared by multiple entities. For instance, example group features may include, but are not limited to, any or all of the following functions:

Call Hold—This function allows a user to keep a particular call alive, while disabling the ability to communicate on the call. Typically, this is done so that a different call can be made the active call in the meantime, to initiate a transfer of the call to a different user or device, or the like.

Call Transfer—This function allows a user to transfer a particular call to a different device or user.

Conferencing—This function allows multiple calls to be merged into a single session, so that three or more endpoints are able to communicate at once.

Call Hunting—This function allows an incoming call to a number to attempt a connection with multiple devices. For instance, if a person does not answer her desktop phone after n-number of rings, this function could be used to then ring her mobile phone.

Call Parking—This function allows a call to be placed on hold and continued from a different device. For instance, a user may park a call so that they can continue the conversation from a different office and telephone.

Call Pickup—This function allows one user to answer calls intended for another user. For instance, if the telephone in a first office is ringing, a user in another office may answer that call using her own telephone.

Call Monitoring—This function allows a user/device to listen in to a call between other users/devices. For instance, a supervisor may utilize this function to listen into a call between an employee and a customer.

Shared Line—This function allows a call to be answered by multiple devices. For instance, this feature can be configured to allow two or more devices to answer an incoming call. Typically, this is done as dual lines (e.g., two devices capable of answering the call), octo-lines (e.g., eight devices capable of answering the call), but could be used across any number of different devices.

Busy Lamp Field (BLF) Speed Dialing—This function corresponds to a set of indicators on a telephone that represent which extensions are engaged in an active call, as well as provide speed dialing capabilities. For instance, a telephone may have several buttons that each represent a different extension and indicates whether that extension is currently busy. Pushing any of these buttons may initiate a call to its corresponding extension.

In addition to identifying the group features for which a user or device is configured to use, configuration analyzer 402 may also assess how each of these entities actually use those group features, according to further embodiments. For instance, as shown, configuration analyzer 402 may leverage graph generator 404, to assess the relationships between the different entities of the on-prem entities and how they use their configured group features. More specifically, graph generator 404 may model this information as a graph, where nodes represent users, devices, etc., as well as their line appearances, line groups, hunt lists, direct and indirect call park groups, pickup groups, intercoms, busy-lamp-field (BLF) speed dials, or other group functions. In such a case graph generator 404 may represent edges between these nodes with attributes that define the nature of the relationship.

In some cases, graph generator 404 may overlay the resulting graph with additional edges that represent actual usage of a given group feature, allowing the edges to be weighted according to their actual use. For instance, if user Alice can park a call that user Bob could answer, but never actually does so, then the corresponding graph edges may have a low weighting, or even a zero-value weighting. From a migration standpoint, this can be quite important, as Alice and Bob do not actually constitute a group that should be migrated together, to avoid group function disruptions.

Another potential component of migration utility process 249 is user interface module 406 that is operable to provide display data to user interface 412, for presentation to an administrator or other interested party. More specifically, user interface module 406 may provide an indication of a candidate set of entities (e.g., users, devices, etc.) of the on-premise telephony system for migration to telephony interconnect service 316, based on them sharing at least one of the group features. For instance, user interface module 406 may traverse the graph(s) generated by graph generator 404, to identify a set of entities that are related to one another and may be migrated to the cloud, together.

In some embodiments, an administrator may specify via user interface 412 the types of relationships between entities that they deem important for purposes of migrating those entities to telephony interconnect service 316. This allows the administrator to further help partition the user and device base into small, migratable groups. For example, if the entire enterprise has static visibility into a pickup group, any group identification that includes that criterion will sort every single endpoint into a single group. Turning off that relationship and instead looking at feature telemetry will likely cause users to be binned into much smaller groups.

Figure 5A:
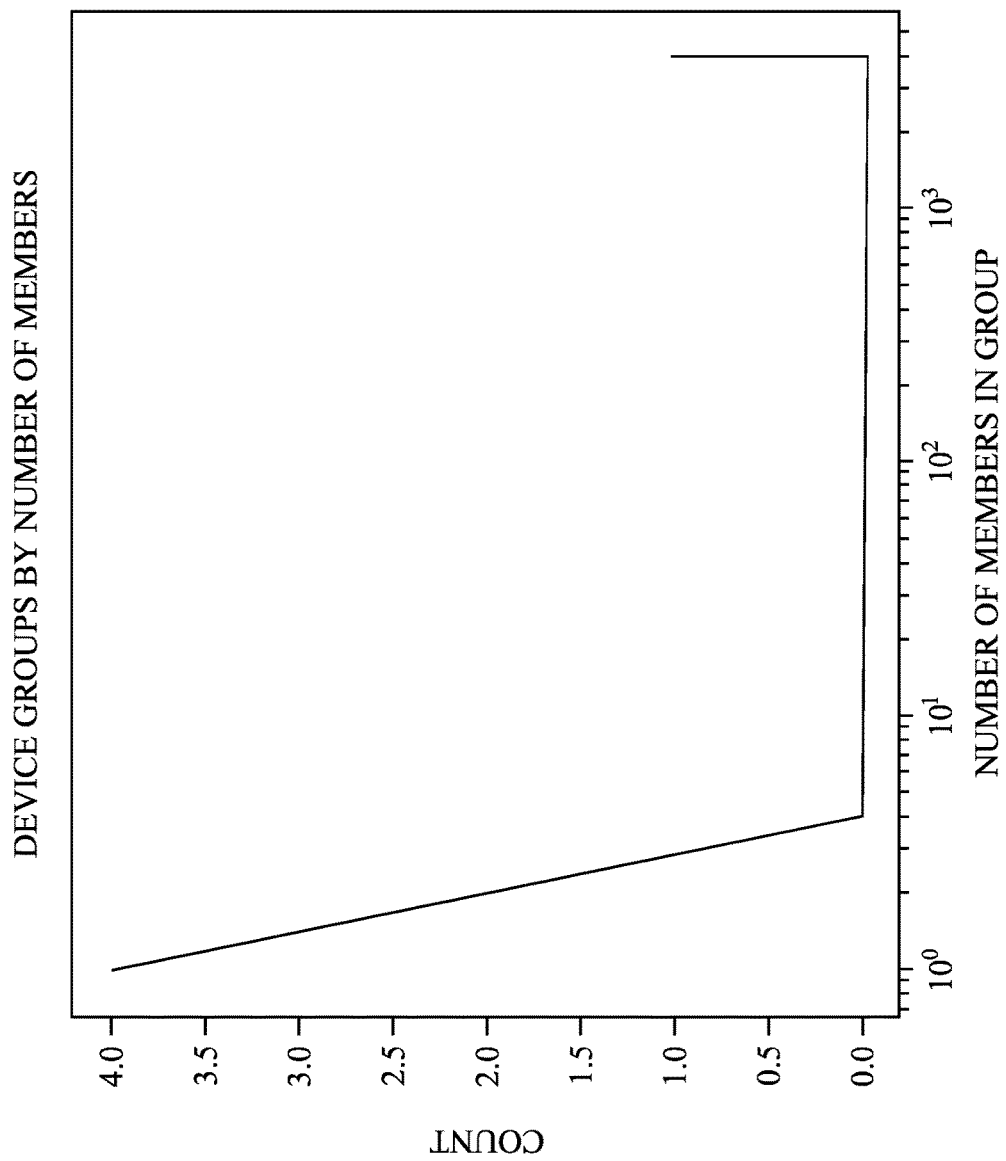
FIGS. 5A-5B illustrate example plots of group sizes.

For instance, FIG. 5A illustrates an example plot 500 of group sizes that may result from an initial pass of analysis by migration utility process 249, without any configured constraints. Here, there are four groups that contain only one member, a diminishing number of groups containing up to three members, and then a single group that includes approximately 3,300 members. This indicates that it is likely that all users have access to a group feature that they do not actually use in practice.

Figure 5B:
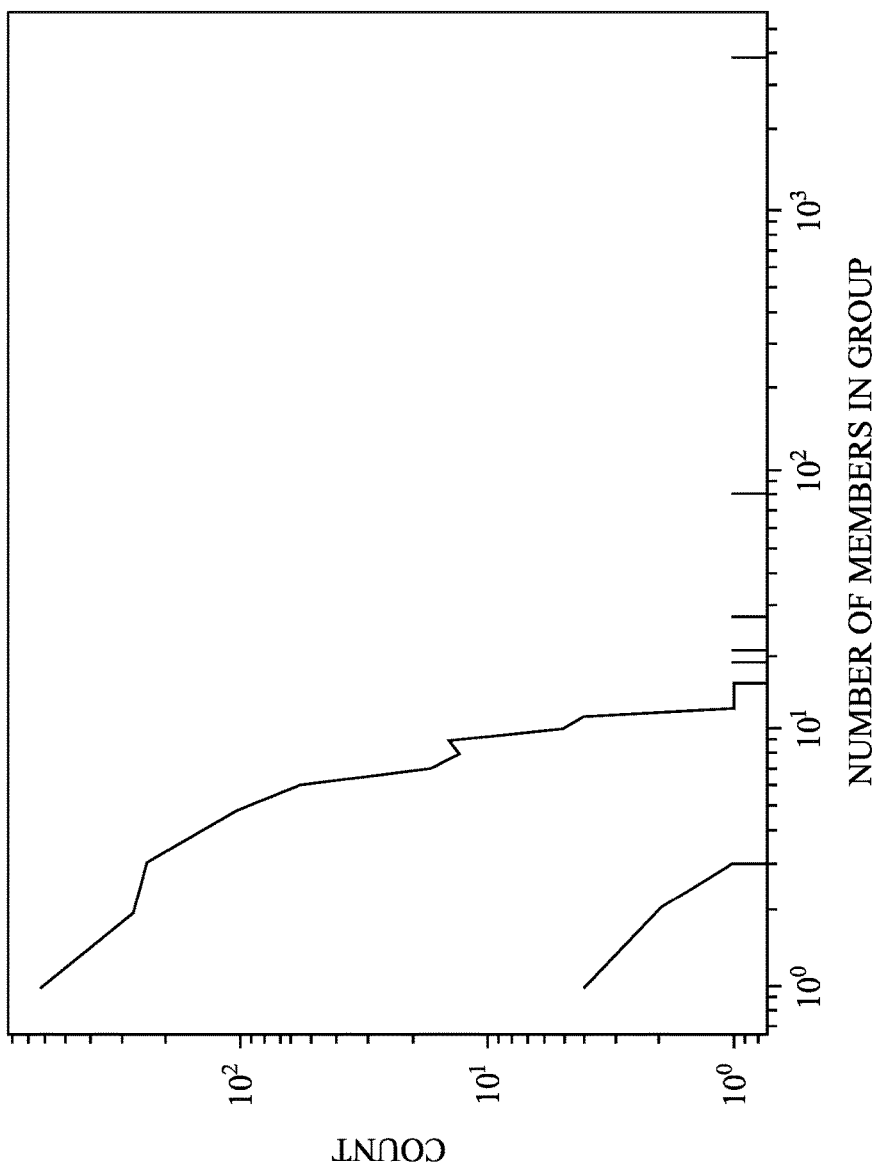

When an administrator has limited the pertinent attributes, graph generator 404 may start at each node in the graph that represents a migratable entity (device or user) and walk the edges with the pertinent attributes. In doing so, each resulting subgraph will include a candidate set of devices and/or users that can be migrated together, without impeding on the function of the group features that they use. For instance, FIG. 5B illustrates an example plot 510 showing the same devices as in FIG. 5A, but this time with the indirect call park relationship disabled. As a result, the sizes of the resulting groups are overwhelmingly of twenty members or fewer, which is much more manageable from a migration standpoint.

As shown in FIG. 4, user interface module 406 may present data regarding the candidate sets of entities for migration to user interface 412 in any number of ways. For instance, user interface module 406 may display an overall graph that describes the number of groups and their sizes, which the administrator can use to quickly see the number of coupled devices or users are in the enterprise. In another example, user interface module 406 may provide a list or view of each group that includes the identities of related devices. In addition, as noted above, the administrator may be able to enable or disable the various attributes (e.g., group features, etc.) that are used by migration utility process 249 to identify the candidate sets of devices or users for migration. For instance, user interface module 406 may provide a dashboard, interactive graph, or the like, so that the administrator can revise the selection criteria, as desired.

Another potential component of migration utility process 249 may be migration engine 408, which is responsible for migrating devices, users/user accounts, etc., from on-prem call agent 410 to telephony interconnect service 316. More specifically, migration engine 408 may be operable to migrate the devices and/or users in a selected candidate set from using on-prem call agent 410 to using a cloud-hosted call agent of telephony interconnect service 316. This may be done, for instance, at the request of an administrator operating user interface 412 to interact with user interface module 406. For instance, after presenting a candidate set of devices or users to the administrator, the administrator may instruct migration engine 408 to initiate the migration of these entities.

Note that while migration engine 408 is show as integrated into migration utility process 249, further embodiments provide for migration engine 408 to be a separate utility. In such cases, the administrator interacting with migration utility process 249 may use the information presented by migration utility process 249 to drive their interactions with migration engine 408.

Figure 6:
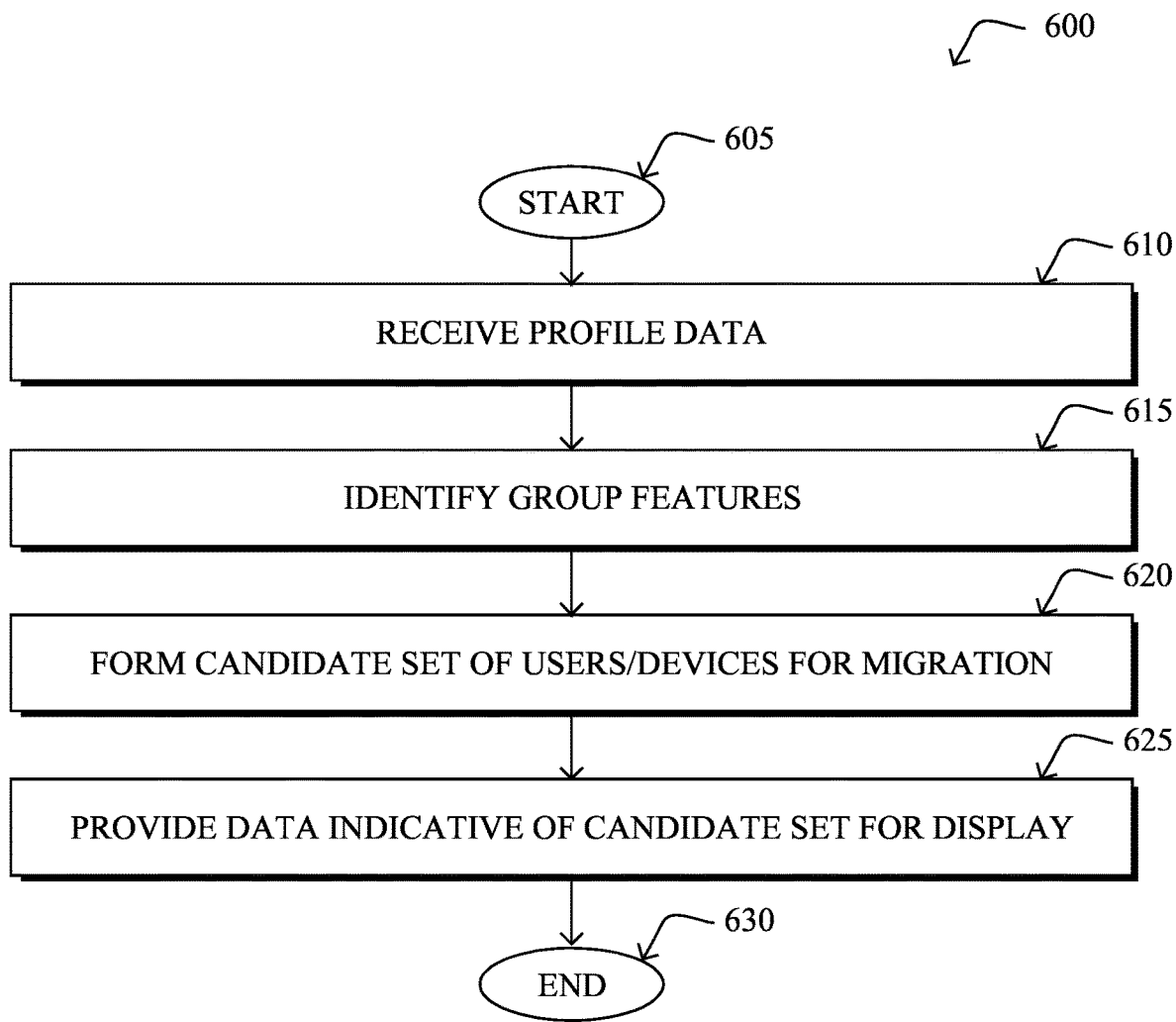
FIG. 6 illustrates an example simplified procedure for evaluating profile data for candidacy to migrate to cloud-hosted telephony services.

FIG. 6 illustrates an example simplified procedure (e.g., a method) for evaluating profile data for candidacy to migrate to cloud-hosted telephony services, in accordance with one or more embodiments described herein. For example, a non-generic, specifically configured device (e.g., device 200), may perform procedure 600 by executing stored instructions (e.g., process 249). The procedure 600 may start at step 605, and continues to step 610, where, as described in greater detail above, the device may receive profile data regarding users or devices of an on-premise telephony system. For instance, the device may do so via an API or by directly communicating with a call agent for the on-premise telephony system.

At step 615, as detailed above, the device may identify, based on the profile data, group features associated with the users or devices of the on-premise telephony system. For instance, the device may assess the profile data to determine whether any particular user profile or device is configured to use a shared call pickup function, a shared call parking function, a shared call monitoring function, a shared line function, a call hunting function, or a busy-lamp-field speed dial function.

At step 620, the device may form a candidate set of users and/or devices of the on-premise telephony system for migration to a cloud-hosted call agent, based on them sharing at least one of the group features, as described in greater detail above. For instance, the device may assess the users and/or devices that share a particular line, etc. In some instances, the device may also select users or devices for inclusion in the candidate set based in part on their actual use of the group features. Indeed, even though a particular user profile or device is configured to use a certain group feature, the potential harm of migrating it to the cloud-hosted call agent is minimal, if it never uses that feature or rarely uses that feature.

At step 625, as detailed above, the device may provide data indicative of the candidate set of users or devices to a user interface for display. For instance, the device may represent the candidate set of users or devices as nodes of a connected graph, thereby allowing an administrator to review their relationships. In further embodiments, the device may also provide additional information regarding the set, such as the size of the set, the users, devices and/or phone numbers associated with the set, etc., for display. In some embodiments, the administrator may also be presented with an option to initiate the migration of that set to the cloud-hosted call agent. In other embodiments, the administrator may initiate the migration through other mechanisms, manually, leveraging the information provided by the device. Procedure 600 then ends at step 630.

It should be noted that while certain steps within procedure 600 may be optional as described above, the steps shown in FIG. 6 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, introduce cloud migration utilities for telephony services. In some aspects, the techniques herein allow for the identification of groups of users and/or devices that should be migrated together to a cloud-hosted service/call agent, so as not to disrupt any preconfigured group features that they may share.

While there have been shown and described illustrative embodiments that provide for cloud migration utilities for telephony services, it is to be understood that various other adaptations and modifications may be made within the spirit and scope of the embodiments herein. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method comprising:
   receiving, at a device, profile data regarding users or devices of an on-premise telephony system;
   identifying, by the device and based on the profile data, group features associated with the users or devices of the on-premise telephony system;
   forming, by the device, a candidate set of users or devices of the on-premise telephony system for migration to a cloud-hosted call agent, based on them sharing at least one of the group features; and
   providing, by the device, data indictive of the candidate set of users or devices to a user interface for display.

2. The method as in claim 1, wherein the device receives the profile data from a call agent for the on-premise telephony system.

3. The method as in claim 1, wherein providing data indictive of the candidate set of users or devices to a user interface for display comprises:
   representing the candidate set of users or devices as nodes of a connected graph.

4. The method as in claim 1, wherein forming the candidate set of users or devices comprises:
   selecting users or devices for inclusion in the candidate set of users or devices based in part on their actual use of the group features.

5. The method as in claim 1, further comprising:
   initiating, by the device, migration of the candidate set of users or devices to the cloud-hosted call agent.

6. The method as in claim 1, wherein the data indictive of the candidate set of users or devices provided to the user interface for display is further indicative of a size of the candidate set of users or devices.

7. The method as in claim 1, wherein the group features comprise a shared call pickup function.

8. The method as in claim 1, wherein the group features comprise a shared call parking function.

9. The method as in claim 1, wherein the group features comprise a shared call monitoring function.

10. The method as in claim 1, wherein the group features comprise a shared line function.

11. The method as in claim 1, wherein the group features comprise a call hunting function or a busy-lamp-field speed dial function.

12. An apparatus, comprising:
    one or more network interfaces;
    a processor coupled to the one or more network interfaces and configured to execute one or more processes; and
    a memory configured to store a process that is executable by the processor, the process when executed configured to:
    receive profile data regarding users or devices of an on-premise telephony system;
    identify, based on the profile data, group features associated with the users or devices of the on-premise telephony system;
    form a candidate set of users or devices of the on-premise telephony system for migration to a cloud-hosted call agent, based on them sharing at least one of the group features; and
    provide data indictive of the candidate set of users or devices to a user interface for display.

13. The apparatus as in claim 12, wherein the apparatus receives the profile data from a call agent for the on-premise telephony system.

14. The apparatus as in claim 12, wherein the apparatus provides data indictive of the candidate set of users or devices to a user interface for display by:
    representing the candidate set of users or devices as nodes of a connected graph.

15. The apparatus as in claim 12, wherein the apparatus forms the candidate set of users or devices by:
    selecting users or devices for inclusion in the candidate set of users or devices based in part on their actual use of the group features.

16. The apparatus as in claim 12, wherein the process when executed is further configured to:
    initiate migration of the candidate set of users or devices to the cloud-hosted call agent.

17. The apparatus as in claim 12, wherein the data indictive of the candidate set of users or devices provided to the user interface for display is further indicative of a size of the candidate set of users or devices.

18. The apparatus as in claim 12, wherein the group features comprise a shared call pickup function or a shared line function.

19. The apparatus as in claim 12, wherein the group features comprise a shared call parking function or a shared call monitoring function.

20. A tangible, non-transitory, computer-readable medium storing program instructions that cause a device to execute a process comprising:
    receiving, at the device, profile data regarding users or devices of an on-premise telephony system;

identifying, by the device and based on the profile data, group features associated with the users or devices of the on-premise telephony system;

forming, by the device, a candidate set of users or devices of the on-premise telephony system for migration to a cloud-hosted call agent, based on them sharing at least one of the group features; and providing, by the device, data indictive of the candidate set of users or devices to a user interface for display.

* * * * *